Figure 1:
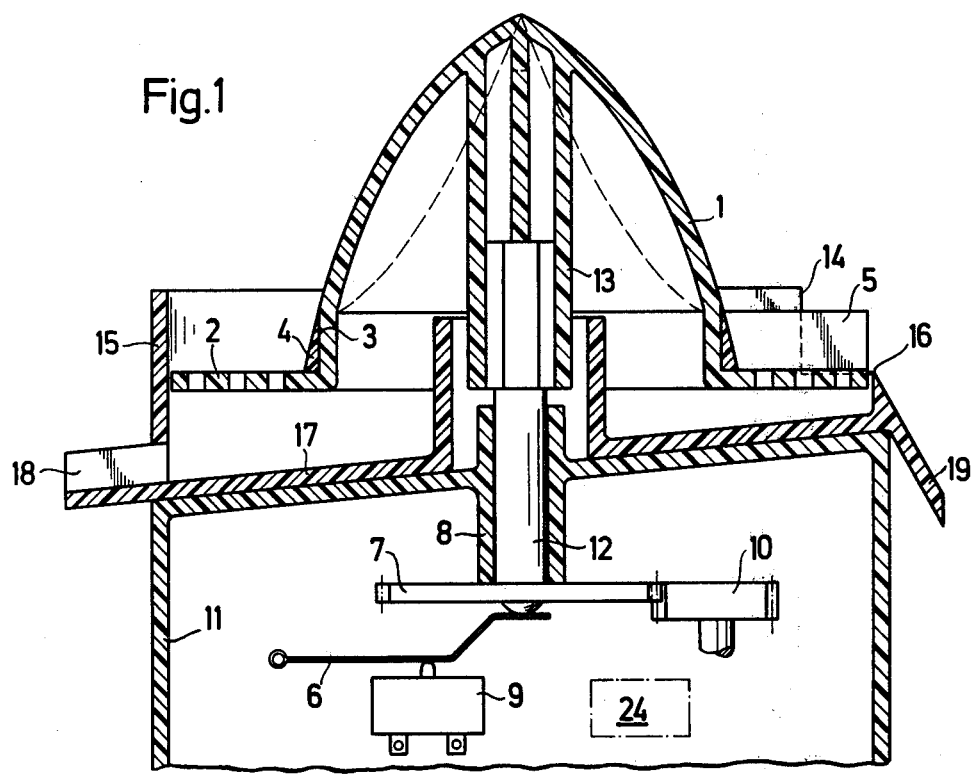

# United States Patent [19]

Ackeret

[11] 4,157,062
[45] Jun. 5, 1979

[54] MOTOR-DRIVEN CITRUS FRUIT PRESS

[75] Inventor: Peter Ackeret, Küsnacht, Switzerland

[73] Assignee: Zyliss Zysset AG, Lyss, Switzerland

[21] Appl. No.: 895,093

[22] Filed: Apr. 10, 1978

[30] Foreign Application Priority Data

Oct. 5, 1977 [DE] Fed. Rep. of Germany ....... 2748683
Feb. 14, 1978 [DE] Fed. Rep. of Germany ....... 2806096

[51] Int. Cl.² .......................... A23N 1/00; A47J 19/02
[52] U.S. Cl. ...................................... 99/503; 100/112; 100/131
[58] Field of Search .................. 99/495, 496, 501–508; 100/213, 112, 131, 97, 98

[56] References Cited

U.S. PATENT DOCUMENTS

| 1,266,030 | 5/1918 | Lins | 99/505 |
| 1,957,346 | 5/1934 | Larson | 99/505 |
| 2,057,227 | 10/1936 | Blum | 99/505 |
| 2,920,669 | 1/1960 | Fromm | 99/503 |
| 3,566,939 | 3/1971 | Hubrich | 99/501 |

FOREIGN PATENT DOCUMENTS 1323666  3/1963  France ........................ 99/501

Primary Examiner—Peter Feldman
Attorney, Agent, or Firm—H. Dale Palmatier

[57] ABSTRACT

A citrus fruit press, a rotary squeezing cone on an axially displaceable driving shaft, a switch and operator therefor aligned with the displaceable shaft, a motor operated by the switch and driving the shaft, a strainer beneath the cone, a delay means acting on the switch to assure one complete revolution of the cone, a spiral wiper on the cone and strainer alternately rotated thereby when the cone is depressed and held stationary by a stop when the cone assumes its upper position, and alternately a second cone, wiper and switch.

9 Claims, 23 Drawing Figures

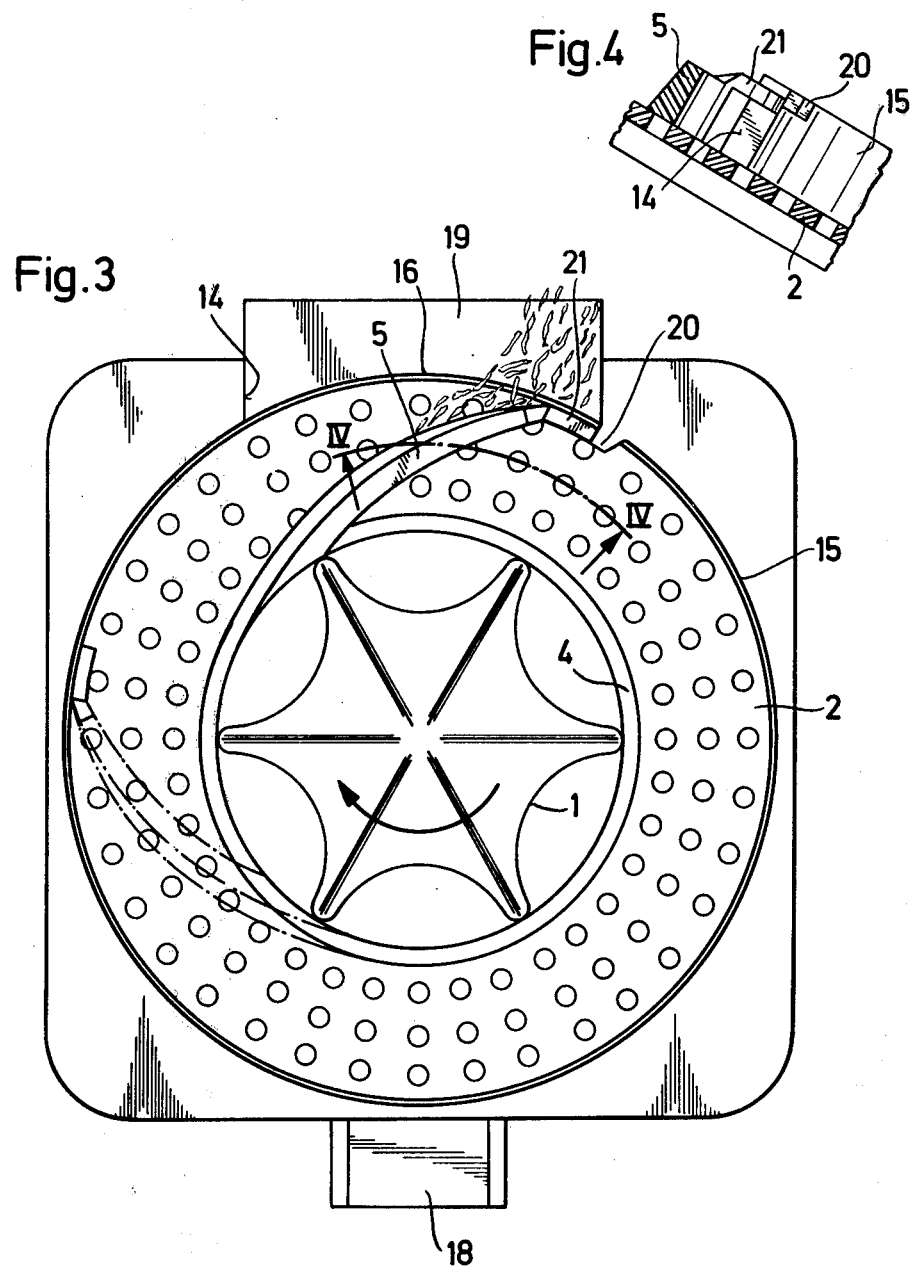

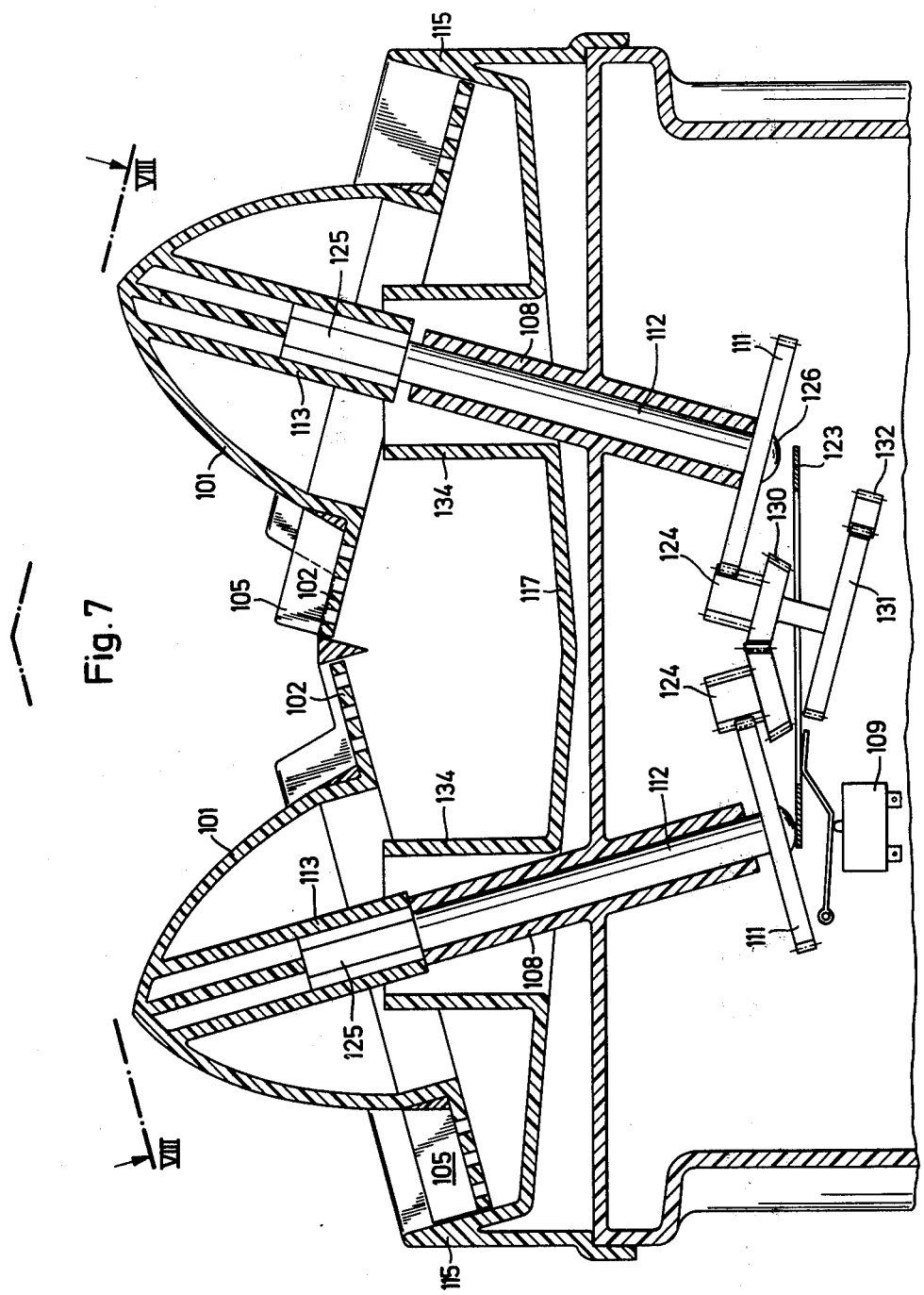

MOTOR-DRIVEN CITRUS FRUIT PRESS

The invention relates to a motor-driven citrus fruit press. Such presses are available on the market and comprise a dejuicing cone driven via gearing means by an electric motor. A fruit half may be pressed manually onto said cone displacing the latter axially by a small distance thereby actuacting a switch to excite the motor. Upon removal of the fruit half from the cone, the motor will switch off. An example for such a motor including the switch is disclosed in German patent specification No. 1,187,349.

Of course, fruit flesh and kernels are pressed out together with the juice, and in order to separate the juice from the waste material, at least one strainer will be provided. On the strainer the waste is connected and after a certain number of dejuiced fruits, the strainer must be cleaned. It has been suggested in German patent application No. P 26 35 577 already to provide a wiper element conveying such waste from the strainer downward into a waste collecting container so that the press can be used continually. In this known press, e.g., the strainer rotates together with the cone while the wiper element is stationary and continuously cleans the strainer. In presses having a quickly revolving cone, this solution, however, does not completely satisfy because the waste is removed prior to the juice having been separated therefrom. It is the object of the invention to provide a citrus fruit press comprising the features recited in the preamble of patent claim 1 wherein the cleaning of the strainer will occur automatically after the processing of each fruit half while the fruit flesh may substantially dry during the very pressing operation.

The solution of this problem is achieved when using the characterizing features of patent claim 1. The press in accordance therewith is provided with the wiper element discussed above, however, the latter is not continuously operative but only upon cessation of the pressure on the dejuicing cone when the latter is returned into its initial position for which purpose, for example, spring bias means are provided. In order to completely clean the strainer, the latter must continue to rotate by at least one complete revolution, and for this purpose switching-off of the motor will be delayed accordingly. This may simply be done mechanically, for example, by a heavy fly wheel or by means of a switch mechanism, scanning the rotation of the strainer and of the dejuicing cone, respectively, or by means of a spring mechanism or other designs with which an expert skilled in the art will be familiar. A particularly simple and inexpensive solution will be described in detail hereunder.

The wiper element may rotate together with the cone and be stopped but in the upper position of the latter by means of a stop element or may be stationarily mounted such that together with the cone the strainer is pushed downwardly, too, so to form a gap between strainer and wiper element permitting passage of the fruit flesh.

It is preferred to displace the strainer together with the cone because under these circumstances a stationary barrier or dam may be maintained about the strainer circumference even at the place where in the upper strainer position the fruit flesh and other waste will be removed from the strainer radially outwardly by means of the wiper element. In this manner, it is prevented that during the very pressing operation juice will be conveyed into the waste collecting container.

It is a further object of the invention to use the dust-protecting cover usually provided for such appliances simultaneously as the waste collecting container, said cover for this purpose being completely removeable or hingedly connected to the press housing.

Embodiments of the citrus fruit press in accordance with the invention are shown in the attached drawings and will be explained in detail hereunder.

Figure 2:
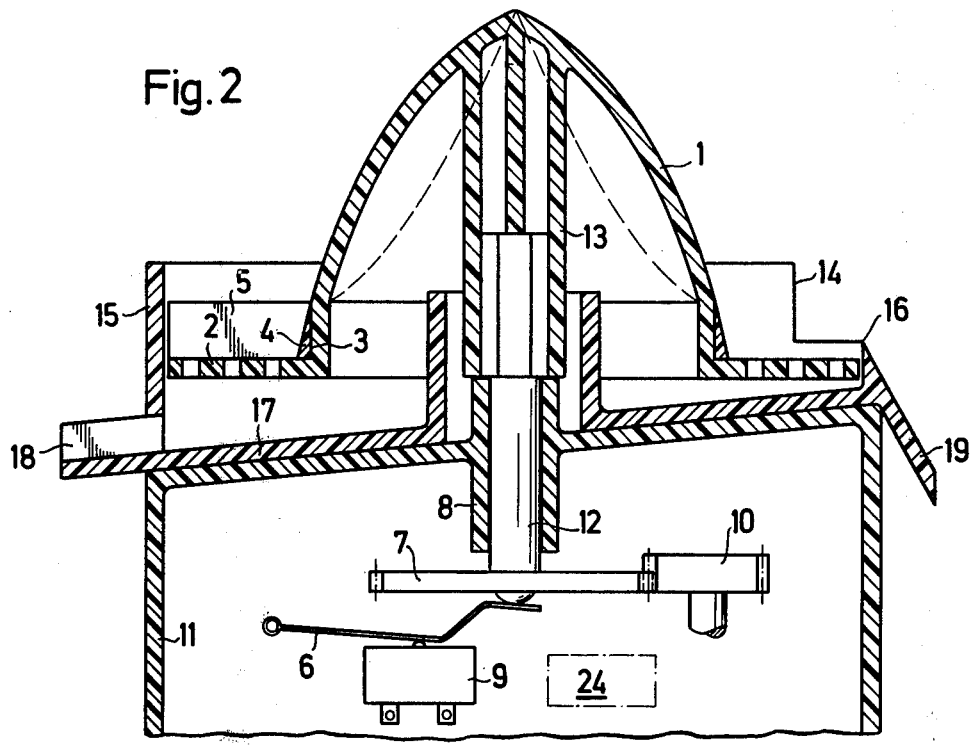
Figure 6:
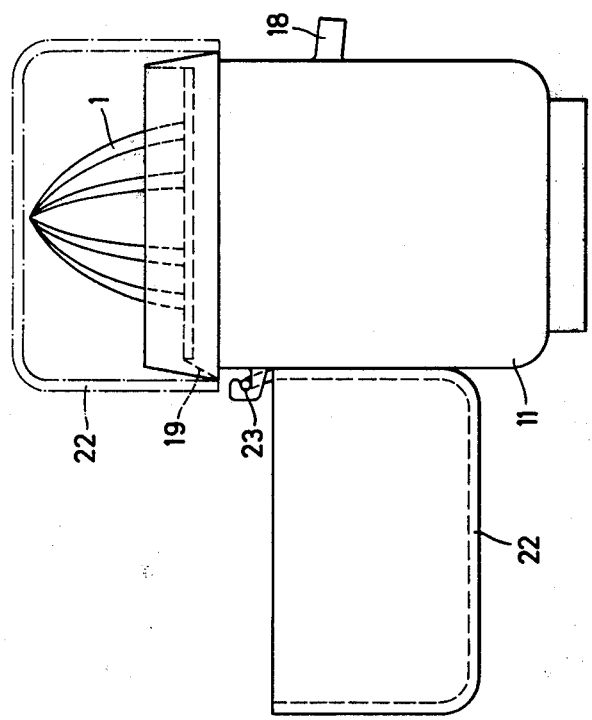
Figure 5:
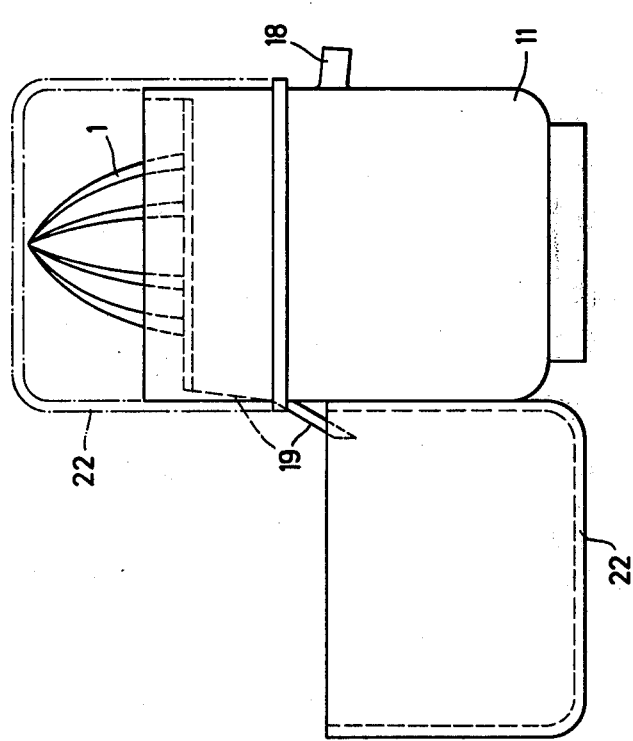
Figure 8:
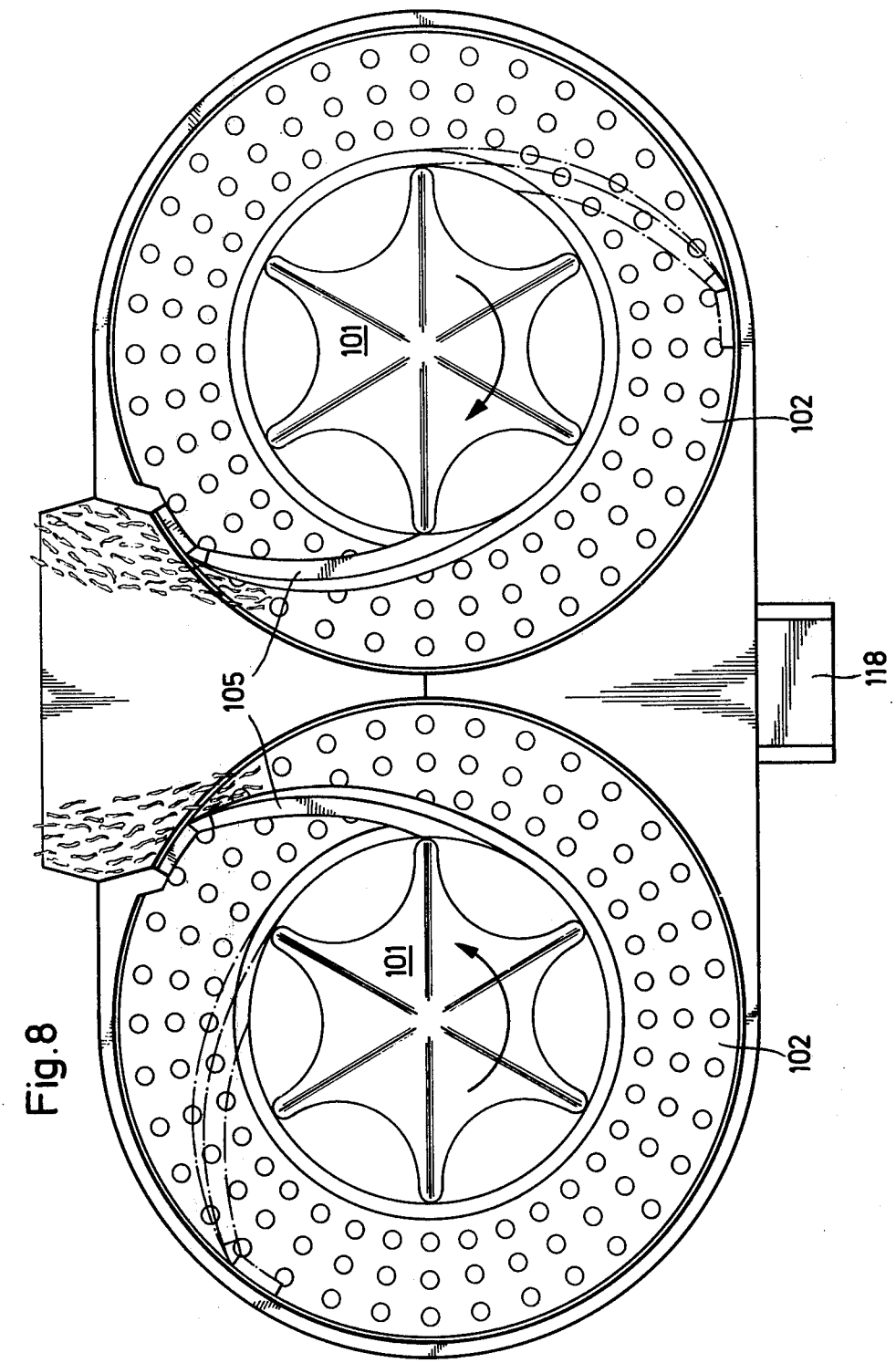
Figure 9:
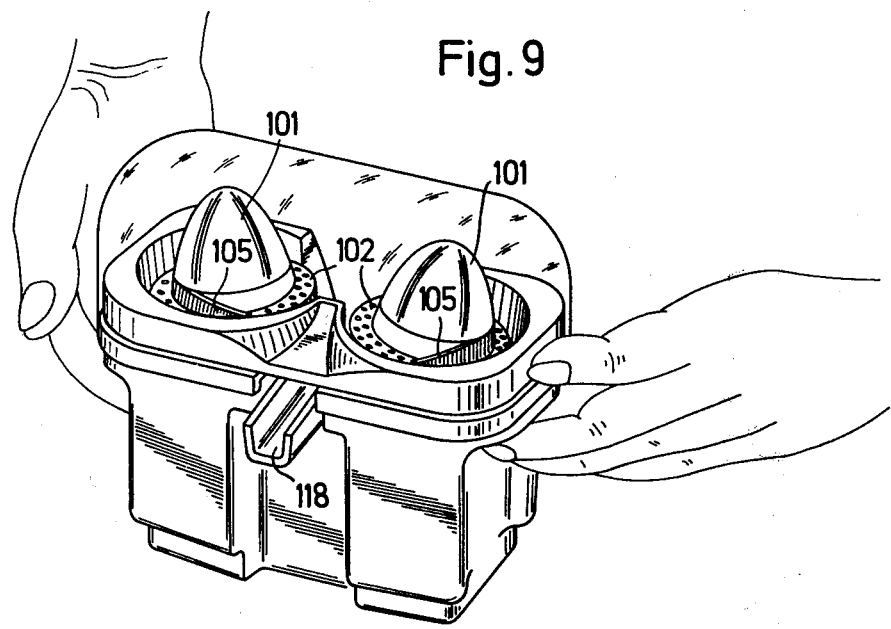
Figure 10:
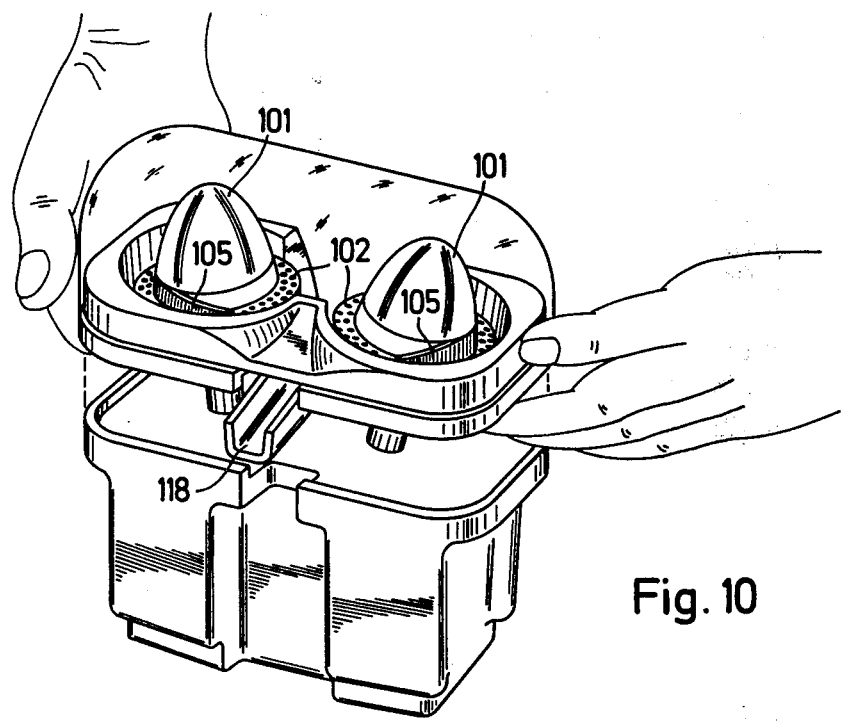
Figure 11:
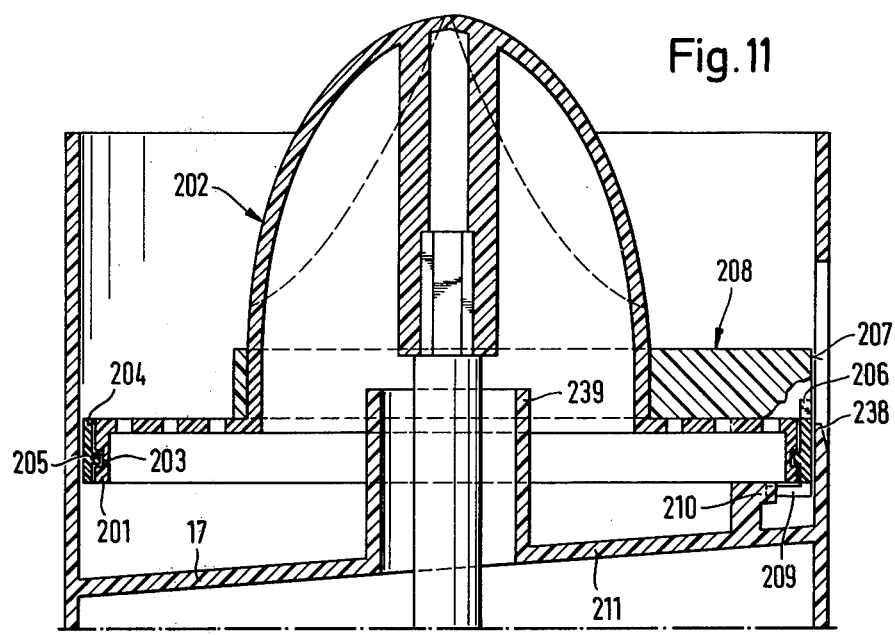
Figure 13:
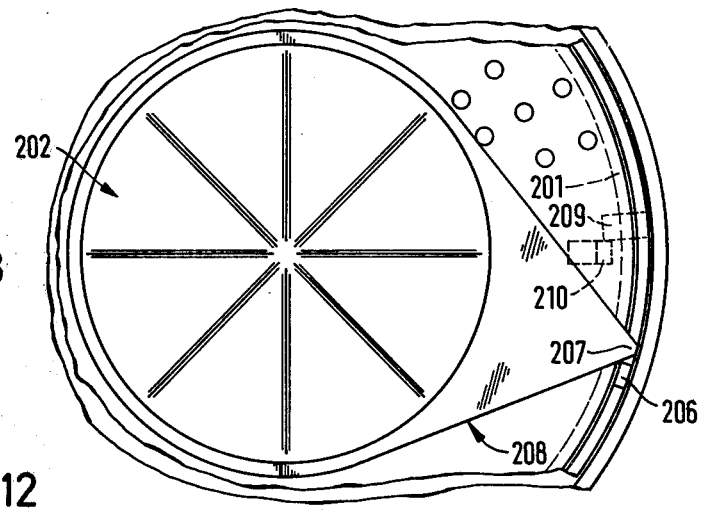
Figure 12:
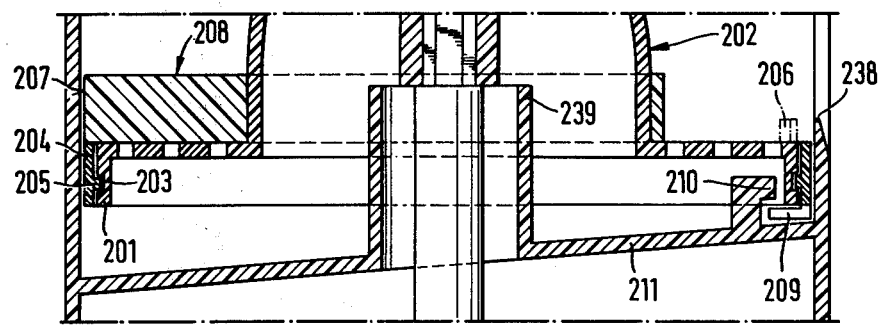
Figure 19:
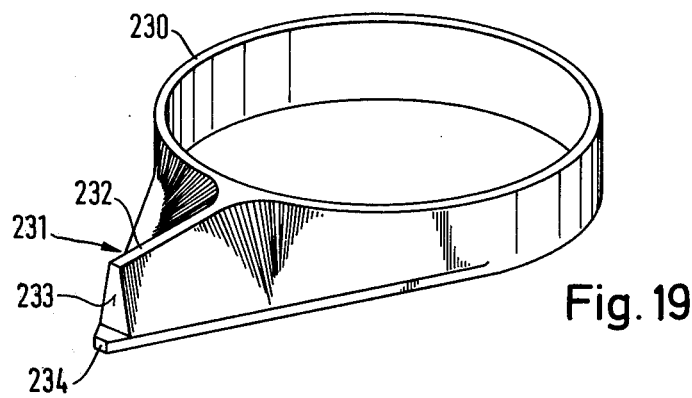
Figure 20:
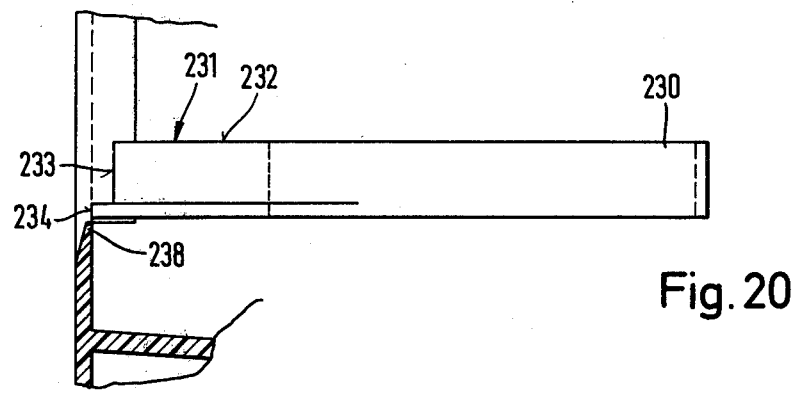
Figure 21:
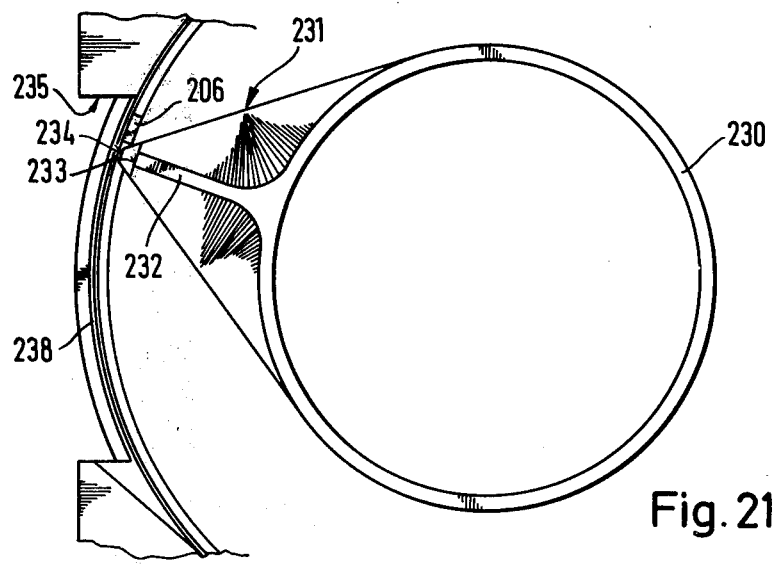
Figure 22:
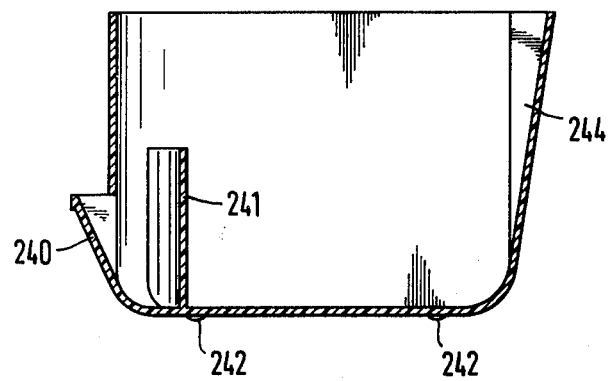
Figure 23:
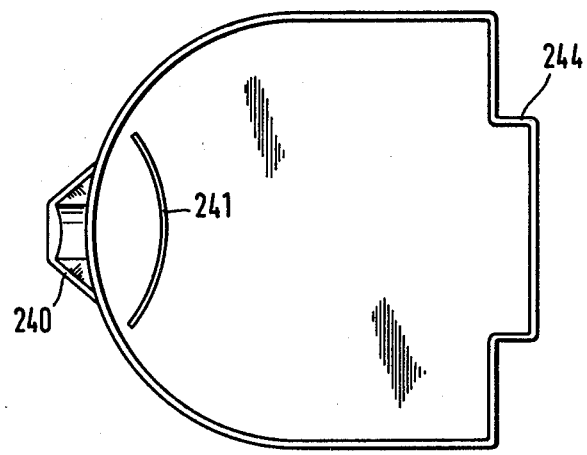

FIG. 1 shows schematically a longitudinal section through a press in a first embodiment with the press cone in its upper, inoperative position, FIG. 2 illustrates similar to FIG. 1 the operative position of the press, FIG. 3 is a plan view of FIGS. 1 and 2, respectively, FIG. 4 shows a front elevation of the wiper element stop means, FIGS. 5 and 6 illustrate schematically in front elevation presses having dust-protective covers serving simultaneously as waste collecting containers, FIG. 7 shows in a similar manner as FIGS. 1 and 2, respectively, a second embodiment comprising two press cones in longitudinal section, FIG. 8 is a plan view of FIG. 7, FIGS. 9 and 10 illustrate the handling of the press for cleaning purposes, FIG. 11 shown in partial longitudinal section a further embodiment of the wiper element control in the operative position thereof, FIG. 12 illustrates the same design in the operative position of the cone, FIG. 13 is a partial plan view of the press shown in FIGS. 11 and 12, FIGS. 14 to 18 relate to a mechanical delay means on a fruit press according to the invention, where-in FIG. 14 shows a bottom plan view of a control curve in a housing sleeve, FIGS. 15 to 17 illustrate in longitudinal section three operative positions of the control means while FIG. 18 illustrates a detail of the control dish in longitudinal section, FIG. 19 shows isometrically a wiper element to be used in a twin-cone press, FIG. 20 illustrates the same wiper element in a longitudinal section and FIG. 21 shows a plan view thereof, and FIGS. 22 and 23 are longitudinal section and plan view, respectively, of a dust-protective cover to be used as the waste collecting container for a one-cone press.

Referring to FIGS. 1 and 2, a dejuicing or press cone 1 is shown integrally molded together with the strainer of plastic material. Loosely on the lower portion of cone 1 an annulus 4 is mounted, connected to a wiper element 5 (FIG. 3): Wiper element 5 extends spirally from annulus 4 to the outer edge of strainer 2 as seen in FIG. 3. The annulus and the upper edge of the wiper element are tapered such that the fruit juice and fruit flesh may flow downwardly on the strainer and will not stick to the annulus, to the wiper element or in any gaps.

The cone with integrally molded tube 13 is wedgedly mounted on driving shaft 12 carrying at its lower end a gear 7. Shaft 12 is axially displaceably journalled in a sleeve 8 forming portion of the motor housing and is continuously biased upwardly by means of a leave spring 6 or by means of a spring mounted in the switch, the upward motion being limited by abutment of the gear 7 at the lower edge of sleeve 8. Upon exerting of pressure on cone 1 by pushing a citrus fruit half to be dejuiced thereupon, the cone is pressed downwardly, deflecting spring 6 and actuates motor switch 9. The motor (not shown) drives pinion 10 which is in continuous engagement with gear 7. The downward displacement of the cone is limited by abutment of tube 13 on the upper edge of sleeve 8. Gear 7 slides axially with its teeth in the teeth of pinion 10 which accordingly has a thickness exceeding that of gear 7.

The juice collecting housing confines the outer edge of strainer 2 with upstanding dam or barrier 15 having an overflow portion 16 but in the angular range of an indentation. In the upper position of the strainer 2, as illustrated in FIG. 1, the strainer is approximately flush with overflow 16 but substantially lower in the lower operative position, shown in FIG. 2 so that the juice pressed out of the fruit cannot flow over indentation edge 16 but will drop down onto the slightly inclined transverse wall 17 where it collects and may be drained at spout 18. The fruit flesh cannot be carried beyond edge 16 either in the operative position of FIG. 2, even under the influence of centrifugal force but may substantially dry off.

In the position shown in FIG. 2 wiper element 5 rotates together with cone 1 and strainer 2 since it is frictionally engaged. In this operative position, thus, the wiper element does not provide a cleaning function. Once the pressure on the cone having ceased, the latter will return into its initial position under the effect of spring 6 and the strainer and the wiper element will be returned together with the cone. The motor, however, is not yet switched off since a delay apparatus, indicated simply as a block 24, causes the assembly comprised of cone, strainer and wiper element to continue rotation by at least one complete revolution. During this revolution the wiper element 5 hits with its hook projection 21 a pin 20 integrally formed with housing 11 and projecting inwardly from barrier 15 so that the wiper element comes to a standstill while the strainer continues to rotate. Only in this position the waste fruit flesh now transported against wiper element 5 will be conveyed due to the spiral design of the wiper onto the outlet 19 beneath which a collecting container for waste material is disposed. As such container, for example, the dust-protective cover 22 may be used which may loosely fit on the housing (FIG. 5) or is mounted by means of a separable hinge 23 (FIG. 6) so that the cover on the one hand will always be returned into the proper position and may on the other hand be removed for cleaning purposes.

In the embodiment of FIG. 7 two identical, symmetrically disposed press cones 101 are provided whose axes define an angle of about 30°. Each cone is provided with a revolving strainer 102. Further, each cone and strainer assembly is provided with its own wiper element 105. Since the cones eventually may be used simultaneously the press, however, should be operative also when but one cone is to be used, and actuating lever 123 is provided for switch 109, the lever being operable by one shaft 112 or by the other shaft 112 or by both shafts simultaneously. The gears 111 engage pinions 124 which, in turn, have engaging conical teeth 130 so that both cones rotate in counterdirection. The cones are driven via one additional single gear 131 and a pinion 132 on the output shaft of a motor (not shown). The delay apparatus for switching-off of the motor is not illustrated either in this drawing.

The shafts 112 are journalled in housing sleeves 108 serving simultaneouls as stop means for the axial displacement of the shafts, and as in the first embodiment, tube 113 within the cone 101 and the gears 111 serving as counterstops.

The juice spout 118 is disposed symmetrically between both press units at the lowermost point of the juice collector 117. To the latter also the protective flanges 134 and the outher barrier 115 are formed. For cleaning of the units the entire collector 117 is lifted from the foot portion of the press, projections 134 permitting the passage of bearing sleeves 108. Due to clutch means 125 the subassemblies consisting each of one cone strainer and wiper element may be released from shafts 112.

This simple disassembly for cleaning purposes will be possible in case of the wiper element forming together with the cones and strainers subassemblies which are removeable. With stationary disposition of the wiper element as mentioned above, it would be very complex to remove the upper portion of the press for cleaning purposes. Therefore, the illustrated embodiment is preferred.

As in the first embodiment again a dust-protective cover may be used as the waste collecting container.

Alternatively, the juice collecting member 117 could be left at the housing and only the cone-strainer-wiper-element subassemblies could be individually removed by means of, say, a removing lever or similar tool.

FIGS. 9 and 10 illustrate the handling.

For dejuicing of citrus fruits having a great proportion of waste material (such fruits are frequently on sale at the end of the Winter season), the design as illustrated in FIGS. 1 to 4 may involve that long and strong flash fibres will stick to the wiper element stop and will block the wiper element prior to the instant where this is desired.

A design which eliminates this drawback is illustrated in FIGS. 11–13. The outer edge 201 of the integral assembly 202 comprising cone and strainer is depending coaxially with respect to the axis of revolution and provided with a radially inwardly pointed groove 203, a stop ring 204 fitting loosely into said groove with a complementarily designed lip 205. A stop pin 206 extends upwardly into the path through which the tip 207 of wiper element 208 rotates during its revolution when the assembly 202 is in the cleaning position shown in FIG. 11. In this axial position of the assembly the stop ring 204 may still rotate therewith until an inwardly projecting lug 209 meets a hook 210 formed integrally to the juice collecting transverse wall 211. In the depressed position of the cone with its strainer, the lug 209 pressed beneath hook 210 as illustrated in FIG. 12. In this design a maximum of three revolutions will be necessary after removal of the fruit: A first revolution until lug 209 hits hook 210, a second revolution until the wiper element (which may for any reason be delayed with respect to the ring) will meet pin 206 and a third revolution to clean the strainer upper face.

A delay system very versatile with respect to the number of revolutions after the dejuicing operation is illustrated in FIGS. 14–18.

A slightly conical lower face 220 of sleeve 8 faces the motor switch 9 with actuating lever 6. This inwardly conical face 220 is provided with a spiral control curve 221 terminating in an indentation 222 at its inner end. This indentation provides space to receive with sufficient clearance a ball 223 once the press cone shaft 12 with integrally formed gear 7 being in its rest position (FIG. 15). In this position the motor has come to a standstill for the motor switch 9 being switched-off via actuating lever 6.

Upon depression of the cone (FIG. 16) the motor is switched on. The ball 223 is displaced downwardly together with gear 7 and will roll outwardly along the inclined surface thereof extending parallel to the slight cone of lower face 222, the centrifugal force acting upon the ball facilitating such motion. At the out rim 224 of gear 7 the ball will abut and rotate therewith as long as a depressing force is acting upon the press cone and, thus, upon shaft 12. Upon release of the cone, this shaft 12 is pushed upwardly due to the spring bias of lever 6, the ball abutting the lowever sleeve face 222. In this position the motor is still exited since the switch is still actuated. At the latest after one revolution the ball will meet the beginning 225 of control curve 221 and will now roll, guided between the curve and gear 7, inwardly until it arrives at indentation 222. Only thereafter the gear may be pushed completely upwardly and the motor may switch off. It is to be noted that to each spiral revolution of the control curve (FIG. 14) a delay of two revolutions is allocated because the ball will proceed inwardly with "half" speed only, these two revolutions being the minimum delay under the assumption that the ball would be just at 225 when the cone depression is released. It will be understood that during the delay period the press cone with its strainer will assume already its upper position to permit the strainer cleaning. For this reason, the shaft 12 is hollow at its lower end and houses a pin 227 biased by helical spring 226 so that pin 227 and shaft 12 are relative to each other displaceable. It will further be understood that helical spring 227 must be stronger than the leave spring allotted to lever 6 in case of the latter being insufficiently strong to return the cone into its rest position.

For a mass production of one cone as well as of twin-cone presses it is adviseable to provide for both types substantially identical subassemblies. For this reason, the cones, strainers, stop rings and wiper elements should be identical for both types, it being recognized, however, that the direction of rotation for both cones in the twin-cone press being counterdirected. The wiper element, therefore, must be designed symmetrically with respect to its axis of rotation. A respective design is illustrated in FIGS. 19 to 21.

The outer contour of the wiper element adjacent its foot is tangential with respect to its inner annulus 230 by means of which it is journalled on the cone. Upwardly, the cleaning arm 231 of the wiper element will taper up to a roof portion 232, such tapering facilitating the flowing down of juice from the wiper element. The radially outer vertical edge 233 of arm 232 is offset inwardly, somewhat with respect to the stop pin 234 in order to prevent that the wiper element loose-fit journalled on the cone be blocked by clamped fibres. For the same reason, a spacing of some millimeters is provided between stop pin 206 and the border edge 235 of the flesh barrier indentation 236 (FIG. 21).

It will be seen in FIGS. 11 and 20, respectively, showing the rest position of the press that in this position the strainer is with its upper face edge above indentation edge 238 which limits the wast flash passage downwardly. In the cleaning position (FIG. 17) the strainer is somewhat lower, i.e. just flush with this edge.

It is further to be observed that the height of this barrier is dimensioned such that it will be lower than the shoulder 239 on the juice collecting housing. The latter is provided with a spout at that point of barrier 15 where the transverse wall 17 is at its lowest point; in FIG. 1 there is even shown such a spout. Conventionally, however, this spout is closed by means of a stop cock. If the user fails to open this stop cock there would be a risk that juice collecting in the space beneath the strainer grow and drop via shoulder 239 into the motor space. Since, however, the barrier indentation is below said shoulder it forms an overflow means and the juice will be transferred into the waste container without distruction of the motor or switch. The juice may, of course, be recollected from the waste container.

This will be facilitated if the waste container is designed as shown in FIGS. 22 and 23. It has a spout 240 and a barrier 241 both integrally molded of plastic material with the container which simultaneously serves as the dust-protective dover. At the bottom of the container the remaining juice from the fruit flesh will collect and may be removed via spout 240, barrier 241 preventing simultaneous removal of the waste material. The knobs 242 integrally formed with the container prevent a finish demolishing of the container bottom.

The input track 244 fits into a respective indentation of the press housing and will position the container in its waste collecting function as well as in its function as a dust-protective cover.

In a twin-cone press according to the contour thereof an elongated waste container will result, and for the purpose of proper distribution of the waste material the waste outlets of both strainers will be somewhat spaced so that the waste will fall into the container at two spaced points.

I claim:

1. A citrus fruit press comprising at least one upstanding cone mounted coaxially on a cone shaft, said cone and said shaft being axially displaceable between an upper inoperative position and a lower operative position, spring means to bias said cone and said shaft into their upper position, comprising further an electric motor drivingly connected to said shaft via gearing means, an electric switch operatively connected to said motor, switch actuating means coupled to said shaft to switch on said motor in said lower position of said cone and said shaft, strainer means being provided beneath said cone, characterized in that each cone is connected with a strainer member revolving therewith, that a wiper element is allocated to each strainer member engaging the upper face thereof, said wiper element being stationary in said upper position of said cone and said shaft only, that delay means are provided to delay switching-off of said switch upon return of said cone and said shaft into their upper position by at least the time period necessary for one complete rotation of said cone and said shaft, said wiper element wiping during said time period fruit flesh collected on said strainer member revolving therebeneath from said upper strainer member face into a waste collecting container.

2. A citrus fruit press as set forth in claim 1 and characterized in that said wiper element is mounted on said cone rotative about the axis thereof, stop means being provided engaged by said wiper element in said upper cone position only.

3. A citrus fruit press as set forth in claim 1, characterized in that said strainer member is axially displaceable together with said cone and said shaft relative to an upstanding barrier member encircling an outer strainer member rim, said barrier member having an indentation disposed, seen in direction of rotation, upstream of said wiper element when stationary, the upper edge of said indentation being flush with said upper strainer member face in said upper cone and shaft position.

4. A citrus fruit press as set forth in claim 1 and having a dust protective cover member, characterized in that said cover member may serve, upside turned down, as said waste collecting container.

5. A citrus fruit press as set forth in claim 3, characterized in that a stop ring is rotatably mounted on the outer periphery of said strainer member, said stop ring having a stop pin projecting upwardly into the path through which said wiper element rotates, a stop hook being stationarily mounted beneath said strainer member and having a stop end projecting into the path through which a stop lug provided at said ring and projecting inwardly rotates in the upper position of said cone, shaft, and strainer member, a passage beneath said hook permitting free passage of said lug when said ring together with said strainer member is in their lower position.

6. A citrus fruit press as set forth in claim 1 and having a transverse wall dividing a housing in an upper juice-collecting chamber and a lower motor and gearing chamber, a sleeve extending through said wall, said cone shaft being journalled within said sleeve, characterized in that said delay means comprise:
- a trunconical radial flange adjacent the sleeve end within said motor chamber, a spiral control groove being provided on the downwardly facing flange interior,
- a trunconical radial counterflange at the shaft end beneath said flange, to counterflange having a cone angle complementary to that of said flange, the counterflange having an upstanding outer rim confining said flange
- a ball having a diameter matching the contour of said groove being captured between said flange and said counterflange, the inner groove end terminating in a depression leaving space for said wall when said flange and said counterflange contact each other in said upper shaft position,
- said ball being freely moveable between said flange and said counterflange when said shaft is pushed downwardly into its lower position, said counterflange rim preventing escapement of said ball,
- said ball forming a stop to prevent spring-biased return of said counterflange until the ball has rolled along said groove into said depression,
- said cone being in its upper position when said ball is caught between said counterflange and said groove.

7. A citrus fruit press as set forth in claim 1, characterized in that said wiper element is symmetrically designed with respect to a plane defined by the shaft axis.

8. A citrus fruit press as set forth in claim 1, characterized in that said indentation has an upper edge below the upper edge of a sleeve encircling said shaft and serving as a dam against entrance of fruit juice into a motor chamber disposed beneath a transverse wall within a press housing.

9. A citrus fruit press as set forth in claim 4, characterized in that said dust-protective cover has a spout and a strainer barrier in front thereon interior of said cover.

* * * * *